United States Patent
Nagai et al.

(10) Patent No.: US 12,091,629 B2
(45) Date of Patent: Sep. 17, 2024

(54) REFRIGERATOR OIL, AND WORKING FLUID COMPOSITION FOR REFRIGERATOR

(71) Applicant: ENEOS CORPORATION, Tokyo (JP)

(72) Inventors: Satoshi Nagai, Tokyo (JP); Tatsuki Nakajima, Tokyo (JP); Yuya Mizutani, Tokyo (JP); Hidetoshi Ogata, Tokyo (JP)

(73) Assignee: ENEOS CORPORATION, Tokyo (JP)

( * ) Notice: Subject to any disclaimer, the term of this patent is extended or adjusted under 35 U.S.C. 154(b) by 0 days.

(21) Appl. No.: 17/915,262

(22) PCT Filed: Mar. 12, 2021

(86) PCT No.: PCT/JP2021/010142
§ 371 (c)(1),
(2) Date: Sep. 28, 2022

(87) PCT Pub. No.: WO2021/200043
PCT Pub. Date: Oct. 7, 2021

(65) Prior Publication Data
US 2023/0135466 A1 May 4, 2023

(30) Foreign Application Priority Data

Apr. 2, 2020 (JP) .................... 2020-066903

(51) Int. Cl.
*C10M 105/38* (2006.01)
*C09K 5/04* (2006.01)
*C10N 30/10* (2006.01)
*C10N 40/30* (2006.01)

(52) U.S. Cl.
CPC ........... *C10M 105/38* (2013.01); *C09K 5/045* (2013.01); *C10M 2207/042* (2013.01); *C10N 2030/10* (2013.01); *C10N 2040/30* (2013.01)

(58) Field of Classification Search
CPC .......... C10N 2020/101; C10N 2030/20; C10N 2040/30; C10N 2030/10; C10N 2020/02; C10N 2020/097; C09K 5/044; C09K 5/045; C09K 2205/122; C10M 169/04; C10M 105/38; C10M 171/008; C10M 2207/3025; C10M 2215/064; C10M 2207/2835; C10M 2207/3045; C10M 2207/042; C10M 2207/026; C10M 2211/022
See application file for complete search history.

(56) References Cited

U.S. PATENT DOCUMENTS

| | | | |
|---|---|---|---|
| 2008/0157023 A1 | 7/2008 | Samuels et al. | |
| 2013/0200295 A1* | 8/2013 | Rebrovic | C10M 171/008 252/68 |
| 2016/0208154 A1* | 7/2016 | Shimomura | C09K 5/044 |
| 2016/0244692 A1 | 8/2016 | Takahashi et al. | |
| 2017/0321099 A1 | 11/2017 | Sethi et al. | |
| 2021/0269692 A1 | 9/2021 | Ota et al. | |

FOREIGN PATENT DOCUMENTS

| | | |
|---|---|---|
| CN | 107001970 A | 8/2017 |
| EP | 2 610 329 A1 | 7/2013 |
| EP | 2 930 228 A1 | 10/2015 |
| EP | 3 088 500 A1 | 11/2016 |
| EP | 4 036 194 A1 | 8/2022 |
| JP | 2000-309791 A | 11/2000 |
| JP | 2002-129177 A | 5/2002 |
| JP | 2010-509488 A | 3/2010 |
| JP | 2018-016736 A | 2/2018 |
| JP | 6545337 B1 | 7/2019 |
| JP | 2019-527285 A | 9/2019 |
| JP | 2020-034260 A | 3/2020 |
| WO | 2008/061079 A2 | 5/2008 |
| WO | 2017/086221 A1 | 5/2017 |
| WO | 2018/022888 A1 | 2/2018 |
| WO | 2020/044721 A1 | 3/2020 |

OTHER PUBLICATIONS

Search Report issued in EP Patent Application No. 21780784.1, Aug. 2, 2023.
ISR issued in International Patent Application No. PCT/JP2021/010142, May 25, 2021, translation.
Written Opinion of ISA issued in Int'l Patent Application No. PCT/JP2021/010142, May 25, 2021, translation.
IPRP issued in International Patent Application No. PCT/JP2021/010142, Oct. 13, 2022, translation.

* cited by examiner

*Primary Examiner* — Vishal V Vasisth
(74) *Attorney, Agent, or Firm* — GREENBLUM & BERNSTEIN, P.L.C.

(57) ABSTRACT

An aspect of the present invention provides a refrigerating machine oil containing an ester-based base oil, at least one epoxy compound selected from an alkyl glycidyl ether and an aryl glycidyl ether, and a phenol-based antioxidant, wherein a content of the epoxy compound is 0.7% by mass or more based on a total amount of the refrigerating machine oil, and the refrigerating machine oil is used with a refrigerant containing trifluoroiodomethane.

5 Claims, No Drawings

REFRIGERATOR OIL, AND WORKING FLUID COMPOSITION FOR REFRIGERATOR

This application is a 371 of PCT/JP2021/010142 filed Mar. 12, 2021

TECHNICAL FIELD

The present invention relates to a refrigerating machine oil and a working fluid composition for a refrigerating machine.

BACKGROUND ART

A refrigerating machine such as a refrigerator includes a refrigerant circulation system including a compressor, a condenser, an expansion mechanism (an expansion valve, a capillary), an evaporator, and the like, and heat exchange is performed by the refrigerant circulating in the refrigerant circulation system.

Compressors for refrigerating machines include rotary compressors, piston-crank compressors, and the like. For example, in a piston-crank type compressor, a rotary motion of a motor is converted into a reciprocating motion by a connecting rod, and a piston coupled to the connecting rod is reciprocated to compress a refrigerant. The refrigerating machine oil is enclosed in a compressor together with a refrigerant, and lubricates sliding members such as a connecting rod and a piston. As such a refrigerating machine oil, for example, the following Patent Document 1 discloses a refrigerating machine oil containing a specific ester oil and various additives.

CITATION LIST

Patent Document

[Patent Document 1] Japanese Patent No. 6545337

SUMMARY OF INVENTION

Technical Problem

According to the study of the present inventors, when a refrigerant containing trifluoroiodomethane is used, coloring of the refrigerating machine oil and generation of impurities are likely to occur, and the conventional refrigerating machine oil has room for improvement in this respect. Therefore, an object of the present invention is to provide a refrigerating machine oil capable of suppressing the occurrence of coloring and impurities even when a refrigerant containing trifluoroiodomethane is used, and a working fluid composition for a refrigerating machine containing the refrigerating machine oil.

Solution to Problem

An aspect of the present invention provides a refrigerating machine oil containing an ester-based base oil, at least one epoxy compound selected from an alkyl glycidyl ether and an aryl glycidyl ether, and a phenol-based antioxidant, wherein a content of the epoxy compound is 0.7% by mass or more based on a total amount of the refrigerating machine oil, and the refrigerating machine oil is used with a refrigerant containing trifluoroiodomethane.

Another aspect of the present invention provides a working fluid composition for a refrigerating machine containing a refrigerant containing trifluoroiodomethane, an ester-based base oil, at least one epoxy compound selected from an alkyl glycidyl ether and an aryl glycidyl ether, and a phenol-based antioxidant, wherein a content of the epoxy compound is 0.7% by mass or more based on a total amount of the refrigerating machine oil.

In each of the above aspects, the epoxy compound may contain at least one selected from the group consisting of an alkyl glycidyl ether represented by the following formula (1) and an aryl glycidyl ether represented by the following formula (3):

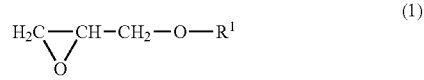
(1)

wherein $R^1$ represents a branched alkyl group,

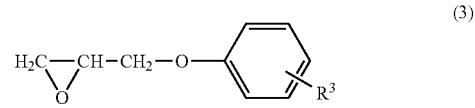
(3)

wherein $R^3$ represents an alkyl group.

The epoxy compound may contain an alkyl glycidyl ether represented by the formula (1). The epoxy compound may contain an aryl glycidyl ether represented by the formula (3). The ester-based base oil may contain at least one selected from the group consisting of a polyol ester and a complex ester. The refrigerant may further contain a saturated hydrofluorocarbon.

Advantageous Effects of Invention

According to the present invention, it is possible to provide a refrigerating machine oil capable of suppressing coloring and generation of impurities even when a refrigerant containing trifluoroiodomethane is used, and a working fluid composition for a refrigerating machine containing the refrigerating machine oil.

DESCRIPTION OF EMBODIMENTS

Hereinafter, embodiments of the present invention will be described in detail.

The refrigerating machine oil according to the present embodiment contains an ester-based base oil, at least one epoxy compound selected from an alkyl glycidyl ether and an aryl glycidyl ether, and a phenol-based antioxidant. The content of the epoxy compound is 0.7% by mass or more based on the total amount of the refrigerating machine oil. The refrigerating machine oil is used with a refrigerant containing trifluoroiodomethane.

The ester-based base oil contained in the refrigerating machine oil according to the present embodiment may contain a monoester, a polyol ester, an aromatic ester, a dibasic acid ester, a complex ester, a carbonate ester, or a mixture thereof. The ester-based base oil preferably contains at least one selected from the group consisting of a polyol ester and a complex ester, and is more preferably a mixture of a polyol ester and complex estera (containing at least one polyol ester and at least one complex ester) from the viewpoint of being able to particularly effectively suppress the generation of impurities.

The polyol ester is, for example, an ester of a polyhydric alcohol and a fatty acid. The fatty acid may be either a saturated fatty acid or an unsaturated fatty acid. The number of carbon atoms of the fatty acid is preferably 4 to 20, more preferably 4 to 18, still more preferably 4 to 9, and particularly preferably 5 to 9. The polyol ester may be a partial ester in which some of the hydroxyl groups of the polyhydric alcohol remain as hydroxyl groups without being esterified, a complete ester in which all of the hydroxyl groups are esterified, or a mixture of a partial ester and a complete ester. The hydroxyl value of the polyolester is preferably 10 mgKOH/g or less, more preferably 5 mgKOH/g or less, and even more preferably 3 mgKOH/g or less. The hydroxyl value in the present invention means a hydroxyl value measured in accordance with JIS K0070:1992.

The proportion of the fatty acid having 4 to 20 carbon atoms in the fatty acid constituting the polyol ester is preferably 20 to 100% by mol, more preferably 50 to 100% by mol, still more preferably 70 to 100% by mol, and particularly preferably 90 to 100% by mol.

Specific examples of the fatty acid having 4 to 20 carbon atoms include butanoic acid, pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, icosanoic acid, and oleic acid. These fatty acids may be linear or branched. More specifically, fatty acids having a branch at the α-position and/or the β-position are preferable, at least one selected from 2-methylpropanoic acid, 2-methylbutanoic acid, 2-methylpentanoic acid, 2-methylhexanoic acid, 2-ethylpentanoic acid, 2-methylheptanoic acid, 2-ethylhexanoic acid, 3,5,5-trimethylhexanoic acid, and 2-ethylhexadecanoic acid is more preferable, and 2-ethylhexanoic acid and/or 3,5,5-trimethylhexanoic acid are still more preferable.

The fatty acid may contain a fatty acid other than the fatty acid having 4 to 20 carbon atoms. The fatty acid other than the fatty acid having 4 to 20 carbon atoms may be, for example, a fatty acid having 21 to 24 carbon atoms. Specific examples thereof include henicholic acid, docosanoic acid, tricosanoic acid, and tetracosanoic acid. These fatty acids may be linear or branched.

As the polyhydric alcohol constituting the polyol ester, a polyhydric alcohol having 2 to 6 hydroxyl groups is preferably used. The number of carbon atoms of polyhydric alcohol is preferably 4 to 12, and more preferably 5 to 10. Specifically, at least one hindered alcohol selected from neopentyl glycol, trimethylolethane, trimethylolpropane, trimethylolbutane, di-(trimethylolpropane), tri-(trimethylolpropane), pentaerythritol, and dipentaerythritol is preferable. Pentaerythritol or a mixture of pentaerythritol and dipentaerythritol is more preferable because it is particularly excellent in compatibility with refrigerants and hydrolysis stability.

The complex ester is, for example, an ester synthesized by the following method (a) or (b):

(a) a method for synthesizing an ester intermediate in which a part of carboxyl groups of a polybasic acid remains without being esterified by adjusting a molar ratio of a polyhydric alcohol and the polybasic acid, and then esterifying the remaining carboxyl groups with a monohydric alcohol;

(b) adjusting the molar ratio of polyhydric alcohol and polybasic acid to synthesize an ester intermediate in which a part of the hydroxyl groups of the polyhydric alcohol remains without being esterified, and then esterifying the remaining hydroxyl groups with a monobasic fatty acid.

The complex ester obtained by the method (a) is less likely to generate a relatively strong acid when hydrolyzed during use as a refrigerating machine oil, and tends to be more stable than the complex ester obtained by the method (b). The complex ester is preferably a complex ester having higher stability and obtained by the method (a) above.

The complex ester is preferably an ester synthesized from at least one selected from polyhydric alcohols having 2 to 4 hydroxyl groups, at least one selected from polybasic acids having 6 to 12 carbon atoms, and at least one selected from monohydric alcohols having 4 to 18 carbon atoms and monobasic fatty acids having 2 to 12 carbon atoms.

Examples of the polyhydric alcohol having 2 to 4 hydroxyl groups include neopentyl glycol, trimethylolpropane, and pentaerythritol. As the polyhydric alcohol having 2 to 4 hydroxyl groups, neopentyl glycol and trimethylolpropane are preferable from the viewpoint of securing a suitable viscosity and obtaining good low-temperature characteristics when a complex ester is used as a base oil, and neopentyl glycol is more preferable from the viewpoint of being able to widely adjust the viscosity.

From the viewpoint of excellent lubricity, the polyhydric alcohol constituting the complex ester preferably further contains a dihydric alcohol having 2 to 10 carbon atoms other than neopentyl glycol in addition to the polyhydric alcohol having 2 to 4 hydroxyl groups. Examples of the dihydric alcohol having 2 to 10 carbon atoms other than neopentyl glycol include ethylene glycol, propanediol, butanediol, pentanediol, hexanediol, 2-methyl-1,3-propanediol, 3-methyl-1,5-pentanediol, and 2,2-diethyl-1,3-pentanediol. Among these, butanediol is preferable from the viewpoint of excellent properties of the lubricating base oil. Examples of the butanediol include 1,2-butanediol, 1,3-butanediol, 1,4-butanediol, and 2,3-butanediol. Among these, 1,3-butanediol and 1,4-butanediol are more preferable from the viewpoint of obtaining good characteristics. The amount of the dihydric alcohol having 2 to 10 carbon atoms other than neopentyl glycol is preferably 1.2 mol or less, more preferably 0.8 mol or less, and still more preferably 0.4 mol or less with respect to 1 mol of the polyhydric alcohol having 2 to 4 hydroxyl groups.

Examples of the polybasic acid having 6 to 12 carbon atoms include adipic acid, pimelic acid, suberic acid, azelaic acid, sebacic acid, phthalic acid, and trimellitic acid. Among these, adipic acid and sebacic acid are preferable, and adipic acid is more preferable, from the viewpoint of excellent balance of properties of the synthesized ester and easy availability. The amount of the polybasic acid having 6 to 12 carbon atoms is preferably 0.4 mol to 4 mol, more preferably 0.5 mol to 3 mol, and still more preferably 0.6 mol to 2.5 mol with respect to 1 mol of the polyhydric alcohol having 2 to 4 hydroxyl groups.

Examples of the monohydric alcohol having 4 to 18 carbon atoms include aliphatic alcohols such as butanol, pentanol, hexanol, heptanol, octanol, nonanol, decanol, dodecanol, and oleyl alcohol. These monohydric alcohols may be linear or branched. From the viewpoint of balance of properties, the monohydric alcohol having 4 to 18 carbon atoms is preferably a monohydric alcohol having 6 to 10 carbon atoms, and more preferably a monohydric alcohol having 8 to 10 carbon atoms. Among these, 2-ethylhexanol and 3,5,5-trimethylhexanol are more preferable from the viewpoint of improving low-temperature characteristics of the synthesized complex ester.

Examples of the monobasic fatty acid having 2 to 12 carbon atoms include ethanoic acid, propanoic acid, butanoic acid, pentanoic acid, hexanoic acid, heptanoic acid, octanoic acid, nonanoic acid, decanoic acid, and dodecanoic acid. These monobasic fatty acids may be linear or branched. The monobasic fatty acid having 2 to 12 carbon atoms is preferably a monobasic fatty acid having 8 to 10 carbon atoms, and among these, from the viewpoint of low-temperature characteristics, 2-ethylhexanoic acid and 3,5,5-trimethylhexanoic acid are more preferable.

The refrigerating machine oil according to the present embodiment may contain a base oil other than the ester-based base oil. As such base oil, known mineral oils or synthetic oils (excluding the ester-based base oil) can be used.

Examples of the mineral oil include paraffinic and naphthenic mineral oils obtained by subjecting a lubricating oil fraction obtained by atmospheric distillation and vacuum distillation of crude oil to refining treatment such as solvent deasphalting, solvent extraction, hydrocracking, solvent dewaxing, catalytic dewaxing, hydrorefining, sulfuric acid washing and clay treatment alone or in combination of two or more thereof, and paraffinic mineral oils are particularly preferred. These mineral oils may be used alone or in combination of two or more thereof at an arbitrary ratio.

As the synthetic oil other than the ester-based base oil, an ether-based base oil is preferably used. Examples of the ether-based base oil include a polyvinyl ether, a polyalkylene glycol, a polyphenyl ether, a perfluoroether, and mixtures thereof. Examples of the synthetic oil other than the ester-based base oil include a carbonate, a ketone, a silicone, a polysiloxane and the like in addition to the ether-based base oil.

In the case where the refrigerating machine oil contains a base oil other than the ester-based base oil, the content of the ester-based base oil may be, for example, 50% by mass or more, 70% by mass or more, 90% by mass or more, or 95% by mass or more, based on the total amount of the base oil. The content of the ester-based base oil may be, for example, less than 100% by mass based on the total amount of the base oil.

The content of the base oil or ester-based base oil may be, for example, 50% by mass or more, 70% by mass or more, 90% by mass or more, or 95% by mass or more based on the total amount of the refrigerating machine oil. The content of the base oil or ester-based base oil may be, for example, less than 100% by mass based on the total amount of the refrigerating machine oil.

The kinematic viscosity of the base oil or the ester-based base oil at 40° C. is not particularly limited, and may be, for example, 3 mm²/s or more, 10 mm²/s or more, or 35 mm²/s or more. The upper limit of the kinematic viscosity at 40° C. of the base oil or the ester-based base oil is not particularly limited, and may be, for example, 500 mm²/s or less or 300 mm²/s or less. The kinematic viscosity at 100° C. of the base oil or the ester-based base oil is not particularly limited, but may be, for example, 1 mm²/s or more or 2 mm²/s or more. The upper limit of the kinematic viscosity at 100° C. of the base oil or ester-based base oil is not particularly limited, and may be, for example, 100 mm²/s or less or 50 mm²/s or less. The kinematic viscosity in the present invention means kinematic viscosity measured in accordance with JIS K2283:2000.

The refrigerating machine oil according to the present embodiment contains at least one epoxy compound selected from alkyl glycidyl ethers and aryl glycidyl ethers.

The alkyl glycidyl ether is a compound represented by the following formula (1):

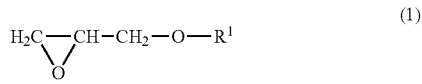

wherein $R^1$ represents an alkyl group.

The alkyl groups represented by $R^1$ may be linear or branched, and are preferably branched from the viewpoint of further suppressing the generation of impurities. The number of carbon atoms of the alkyl group may be 5 or more, 6 or more, 7 or more, or 8 or more, and may be 18 or less, 14 or less, 10 or less, or 8 or less.

Examples of the alkyl glycidyl ether include 2-ethylhexyl glycidyl ether, decyl glycidyl ether, undecyl glycidyl ether, dodecyl glycidyl ether, tridecyl glycidyl ether, and tetradecyl glycidyl ether.

The aryl glycidyl ether is a compound represented by the following formula (2):

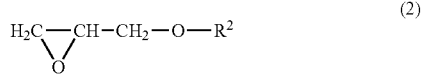

wherein $R^2$ represents an aryl group.

The number of carbon atoms of the aryl groups represented by $R^2$ may be 6 or more, 7 or more, 8 or more, 9 or more, or 10 or more, and may be 18 or less, 16 or less, 14 or less, 12 or less, or 10 or less.

From the viewpoint of further suppressing the generation of impurities, the aryl glycidyl ether is preferably a compound represented by the following formula (3):

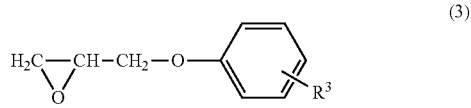

wherein $R^3$ represents an alkyl group.

The alkyl groups represented by $R^3$ may be linear or branched, and are preferably branched from the viewpoint of further suppressing the generation of impurities. The number of carbon atoms of the alkyl group may be 1 or more, 2 or more, 3 or more, or 4 or more, and may be 12 or less, 10 or less, 8 or less, 6 or less, or 4 or less.

Examples of the aryl glycidyl ether include phenyl glycidyl ether, n-butylphenyl glycidyl ether, i-butylphenyl glycidyl ether, sec-butylphenyl glycidyl ether, tert-butylphenyl glycidyl ether, pentylphenyl glycidyl ether, hexylphenyl glycidyl ether, heptylphenyl glycidyl ether, octylphenyl glycidyl ether, nonylphenyl glycidyl ether, and decylphenyl glycidyl ether.

From the viewpoint of suppressing coloring and generation of impurities, the content of the epoxy compound may be 0.7% by mass or more, preferably 0.9% by mass or more, more preferably 1% by mass or more, and even more preferably 2% by mass or more, or 2.5% by mass or more, based on the total amount of the refrigerating machine oil.

The upper limit of the content of the epoxy compound is not particularly limited, but is preferably 10% by mass or less, more preferably 5% by mass or less, and still more preferably 4% by mass or less, based on the total amount of the refrigerating machine oil.

The refrigerating machine oil according to the present embodiment contains a phenol-based antioxidant. The phenol-based antioxidant may be a hindered phenol-based antioxidant. In the present specification, the hindered phenol-based antioxidant is a compound having a structure in which a benzene ring, at least one hydroxyl group and at least one tert.-butyl group which are bonded to the benzene ring are contained, and bonding positions of the hydroxyl group and the tert.-butyl group in the benzene ring are adjacent to each other. The number of tert.-butyl groups bonded adjacent to the bonding position of the hydroxyl group in the benzene ring is preferably two. Examples of the hindered phenol-based antioxidant include 2,6-di-tert.-butyl-p-cresol (DBPC), 2,6-di-tert.-butyl-phenol, 4,4'-methylenebis(2,6-di-tert.-butyl-phenol), and 2-tert.-butyl-4-methoxyphenol. The hindered phenol-based antioxidant preferably contains DBPC.

In addition, the phenol-based antioxidant may be an alkylated hydroxyanisole antioxidant (excluding an antioxidant corresponding to the hindered phenol-based antioxidant). Specific examples of the alkylated hydroxyanisole antioxidant include butylhydroxyanisole (BHA), and more specific examples thereof include alkylated hydroxyanisole compounds such as 3-tert.-butyl-4-hydroxyanisole (2-tert.-butyl-4-methoxyphenol). The phenol-based antioxidant may contain a hindered phenol-based antioxidant and/or an alkylated hydroxyanisole antioxidant.

The content of the phenol-based antioxidant is preferably 0.1% by mass or more, more preferably 0.3% by mass or more, and even more preferably 0.6% by mass or more, or 0.9% by mass or more, based on the total amount of the refrigerating machine oil, from the viewpoint of more effectively suppressing coloring and generation of impurities. The upper limit of the content of the phenol-based antioxidant is not particularly limited, but is preferably 10% by mass or less, more preferably 5% by mass or less, and still more preferably 3% by mass or less, based on the total amount of the refrigerating machine oil.

In the refrigerating machine oil according to the present embodiment, the mass ratio of the content of the epoxy compound to the content of the phenol-based antioxidant ((content of epoxy compound)/(content of phenol-based antioxidant)) is preferably 0.05 or more, more preferably 0.3 or more, and even more preferably 0.7 or more, from the viewpoint of more effectively suppressing coloring and generation of impurities. The upper limit of the mass ratio is preferably 100 or less, more preferably 50 or less, and even more preferably 10 or less, and may be 5 or less, 2 or less, or 1 or less, from the viewpoint of more effectively suppressing coloring and generation of impurities.

The refrigerating machine oil according to the present embodiment may further contain other additives in addition to the components described above. Examples of the other additives include antioxidants other than the phenol-based antioxidants, acid scavengers other than the above-described epoxy compounds, extreme pressure agents, oiliness agents, antifoaming agents, metal deactivators, antiwear agents, viscosity index improvers, pour point depressants, and detergent dispersants. The total content of these additives is not particularly limited, but may be 10% by mass or less or 5% by mass or less based on the total amount of the refrigerating machine oil.

The kinematic viscosity at 40° C. of the refrigerating machine oil may be preferably 3 mm$^2$/s or more, more preferably 4 mm$^2$/s or more, and still more preferably 5 mm$^2$/s or more. The kinematic viscosity at 40° C. of the refrigerating machine oil may be preferably 500 mm$^2$/s or less, more preferably 400 mm$^2$/s or less, and still more preferably 300 mm$^2$/s or less. The kinematic viscosity at 100° C. of the refrigerating machine oil may be preferably 1 mm$^2$/s or more, more preferably 2 mm$^2$/s or more. The kinematic viscosity at 100° C. of the refrigerating machine oil may be preferably 100 mm$^2$/s or less, more preferably 50 mm$^2$/s or less.

The refrigerating machine oil according to the present embodiment generally exists and lubricates in a state of a working fluid composition for a refrigerating machine in which it is mixed with a refrigerant containing trifluoroiodomethane in a refrigerating machine including a refrigerant circulation system having a compressor, a condenser, an expansion mechanism, and an evaporator. That is, the working fluid composition for a refrigerating machine according to the pre sent embodiment contains a refrigerant containing trifluoroiodomethane and the refrigerating machine oil.

The content of the refrigerating machine oil in the working fluid composition for a refrigerating machine may be 1 to 500 parts by mass, or 2 to 400 parts by mass, with respect to 100 parts by mass of the refrigerant.

The refrigerant is not particularly limited as long as it contains trifluoroiodomethane. The refrigerant may contain only trifluoroiodomethane or may further contain a refrigerant other than trifluoroiodomethane. The content of trifluoroiodomethane is preferably 10% by mass or more, more preferably 20% by mass or more, and still more preferably 30% by mass or more, based on the total amount of the refrigerant. The content of trifluoroiodomethane is preferably 100% by mass or less, more preferably 50% by mass or less, and even more preferably 40% by mass or less, based on the total amount of the refrigerant.

Examples of the refrigerant other than trifluoroiodomethane include fluorine-containing ether-based refrigerants such as a saturated hydrofluorocarbon, an unsaturated hydrofluorocarbon, a hydrocarbon, and a perfluoroether, bis(trifluoromethyl) sulfide, natural refrigerants such as ammonia and carbon dioxide, and mixed refrigerants of two or more refrigerants selected from these refrigerants.

Examples of the saturated hydrofluorocarbon (HFC) include a saturated hydrofluorocarbon having preferably 1 to 3 carbon atoms, more preferably 1 to 2 carbon atoms. Specific examples include difluoromethane (R32), trifluoromethane (R23), pentafluoroethane (R125), 1,1,2,2-tetrafluoroethane (R134), 1,1,1,2-tetrafluoroethane (R134a), 1,1,1-trifluoroethane (R143a), 1,1-difluoroethane (R152a), fluoroethane (R161), 1,1,1,2,3,3,3-heptafluoropropane (R227 ea), 1,1,1,2,3,3-hexafluoropropane (R236ea), 1,1,1,3,3,3-hexafluoropropane (R236fa), 1,1,1,3,3-pentafluoropropane (R245fa), and 1,1,1,3,3-pentafluorobutane (R365mfc), or a mixture of two or more thereof.

The saturated hydrofluorocarbon is appropriately selected from the above depending on the application and the required performance. Preferable examples include R32 alone; R23 alone; R134a alone; R125 alone; a mixture of R134a/R32 of 60 to 80% by mass/40 to 20% by mass; a mixture of R32/R125 of 40 to 70% by mass/60 to 30% by mass; a mixture of R125/R143a of 40 to 60% by mass/60 to 40% by mass; a mixture of R134a/R32/R125 of 60% by mass/30% by mass/10% by mass; a mixture of R134a/R32/R125 of 40 to 70% by mass/15 to 35% by mass/5 to 40% by mass; and a mixture of R125/R134a/R143a of 35 to 55% by mass/1 to 15% by mass/40 to 60% by mass. More specifically, a mixture of R134a/R32 of 70/30% by mass; a mixture of R32/R125 of 60/40% by mass; a mixture of R32/R125 of 50/50% by mass (R410A); a mixture of R32/R125 of 45/55% by mass (R410B); a mixture of R125/R143a of 50/50% by mass (R507C); a mixture of R32/R125/R134a of 30/10/60% by mass; a mixture of R32/R125/R134a of 23/25/52% by mass (R407E); and a mixture of R125/R134a/R143a of 44/4/52% by mass (R404A).

Preferable examples of the mixed refrigerant of trifluoroiodomethane and the saturated hydrofluorocarbon include an R32/R125/trifluoroiodomethane mixed refrigerant and an R32/R410A/trifluoroiodomethane mixed refrigerant. The ratio of (content of R32/content of trifluoroiodomethane) in such a mixed refrigerant is preferably 10/90 to 90/10, more preferably 30/70 to 70/30, still more preferably 40/60 to 60/40, and particularly preferably 50/50 to 60/40, from the viewpoint of compatibility with refrigerating machine oil, low GWP, and incombustibility. Similarly, the ratio of the mixed refrigerant of (sum of content of R32 and content of trifluoroiodomethane/content of R125) in such a mixed refrigerant is preferably 10/90 to 95/5, more preferably 50/50 to 95/5, and still more preferably 80/20 to 95/5.

The unsaturated hydrofluorocarbon (HFO) is preferably a fluoropropene, more preferably a fluoropropene having 3 to 5 fluorine atoms. Specifically, any one of 1,2,3,3,3-pentafluoropropene (HFO-1225ye), 1,3,3,3-tetrafluoropropene (HFO-1234ze), 2,3,3,3-tetrafluoropropene (HFO-1234yf), 1,2,3,3-tetrafluoropropene (HFO-1234ye), and 3,3,3-trifluoropropene (HFO-1243zf), or a mixture of two or more thereof are preferable as the unsaturated hydrofluorocarbon. One or two or more selected from HFO-1225ye, HFO-1234ze and HFO-1234yf are preferable from the viewpoint of the physical properties of the refrigerant.

The hydrocarbon is preferably a hydrocarbon having 1 to 5 carbon atoms, more preferably a hydrocarbon having 2 to 4 carbon atoms. Specific examples of the hydrocarbon include methane, ethylene, ethane, propylene, propane (R290), cyclopropane, normal butane, isobutane, cyclobutane, methylcyclopropane, 2-methylbutane, normal pentane, and a mixture of two or more thereof. Among them, those which are gaseous at 25° C. and 1 atm are preferably used, and propane, normal butane, isobutane, 2-methylbutane or a mixture thereof is preferable.

The refrigerating machine oil and the working fluid composition for a refrigerating machine according to the present embodiment are suitably used for an air conditioner having a reciprocating or rotary hermetic compressor, a refrigerator, an open or hermetic car air conditioner, a dehumidifier, a water heater, a freezer, a freezing and refrigerating warehouse, an automatic vending machine, a showcase, a refrigerating machine such as a chemical plant, and a refrigerating machine having a centrifugal compressor.

EXAMPLES

Hereinafter, the present invention will be described in more detail based on examples, but the present invention is not limited to the following examples.
[Preparation of Refrigerating Machine Oil]
The following components were used to prepare a refrigerating machine oil having a composition (% by mass based on the total amount of the refrigerating machine oil) shown in Tables 1 to 3.

(Base Oil)
A1: polyolester of pentaerithritol and a mixed fatty acid of 2-ethylhexanoic acid/3,5,5-trimethylhexanoic acid (mixing ratio (mass ratio): 37/63) (kinematic viscosity at 40° C.: 75.5 mm$^2$/s, kinematic viscosity at 100° C. 8.9 mm$^2$/s)
A2: mixed base oil of the following (a1) and (a2) (mixing ratio (mass ratio):(a1)/(a2)=60/40)
(a1) polyolester of pentaerithritol and mixed fatty acid of 2-ethylhexanoic acid/3,5,5-trimethylhexanoic acid (molar ratio: 48/52)
(a2) complex ester obtained by reacting neopentyl glycol (1 mol) and 1,4-butanediol (0.2 mol) with adipic acid (1.5 mol), further reacting the resulting ester intermediate with 3,5,5-trimethylhexanol (1.1 mol), and removing the remaining unreacted materials by distillation (Epoxy Compound)
B1: 2-ethylhexyl glycidyl ether
B2: phenyl glycidyl ether
B3:4-tert-butylphenyl glycidyl ether
b4: glycidyl neodecanoate (glycidyl ester)
b5:3,4-epoxycyclohexylmethyl-3,4-epoxycyclohexanecarboxylate (cycloaliphatic diepoxide)

(Antioxidant)
C1: 2,6-di-tert.-butyl-p-cresol (DBPC)
C2: mixture containing 2-tert.-butyl-4-methoxyphenol and 3-tert.-butyl-4-methoxyphenol in a mass ratio of 1:1
c3: alkyldiphenylamine (mixture of diphenylamine and 2,4,4-trimethyl-1-pentene)

[Evaluation of Refrigerating Machine Oil]
Each of the refrigerating machine oils of Examples and Comparative Examples was subjected to the following evaluation tests.

First, as a refrigerant containing trifluoroiodomethane, a mixed refrigerant of R32 (difluoromethane)/R125 (pentafluoroethane)/trifluoroiodomethane=49.0/11.5/39.5 (mass ratio) was prepared. In detail, R32, R410A (mixed refrigerant of R32/R125=50/50 (mass ratio)), and trifluoroiodomethane were mixed at a mass ratio of R32/R410A/trifluoroiodomethane=37.5/23/39.5 to prepare a refrigerant containing trifluoroiodomethane having the above-described composition. The refrigerant containing trifluoroiodomethane having this composition has a GWP of 733, and is considered to be a nonflammable refrigerant (A1) in the ASHRAE category.

Subsequently, in an autoclave, 30 g of the refrigerating machine oil (initial hue L0.5) prepared to have a water content of 10 ppm by mass or less, a 0.6 mmϕ×50 mm catalyst (one of each of Cu, Fe, and Al), and 30 g of the refrigerant containing trifluoroiodomethane prepared as described above were charged, heated to 175° C., and held for the time shown in Table 1 in the 200 ml autoclave. The content of impurities and the hue (ASTM D156) of the refrigerating machine oil after the lapse of each time were measured. The content of impurities (mg/100 gOIL (refrigerating machine oil)) was calculated from the mass of a filtrate obtained by filtering the heated refrigerating machine oil through a cellulose filter having a pore size of 0.3 μm, sufficiently washing the filtrate and the filter with hexane to remove hexane-soluble components, and drying the filtrate, with reference to JIS K2276. The results are shown in Tables 1 to 3.

TABLE 1

|  |  | Example 1 | Example 2 | Example 3 | Example 4 | Example 5 | Example 6 | Example 7 |
|---|---|---|---|---|---|---|---|---|
| Composition (% by mass) | A1 | Balance | Balance | Balance | Balance | Balance | Balance | Balance |
|  | A2 | — | — | — | — | — | — | — |
|  | B1 | 3 | 3 | 0.7 | 4 | 3 | 0.7 | 0.7 |
|  | B2 | — | — | — | — | — | — | — |
|  | B3 | — | — | — | — | — | — | — |
|  | b4 | — | — | — | — | — | — | — |
|  | b5 | — | — | — | — | — | — | — |
|  | C1 | 0.9 | 0.9 | 0.9 | 0.9 | 0.3 | 0.3 | 0.3 |
|  | C2 | — | 0.9 | — | — | — | — | — |
|  | c3 | — | — | — | — | — | — | — |
| Test time | h | 48 | 168 | 48 | 48 | 48 | 48 | 96 |
| Impurities | mg/100 gOIL | 2.4 | 3.3 | 0.9 | 2.4 | 3.0 | 2.5 | 3.2 |
| Hue | ASTM D156 | L0.5 | L2.0 | L1.0 | L0.5 | L0.5 | L0.5 | L2.5 |

TABLE 2

|  |  | Example 8 | Example 9 | Example 10 | Example 11 | Example 12 |
|---|---|---|---|---|---|---|
| Composition (% by mass) | A1 | Balance | Balance | Balance | Balance | — |
|  | A2 | — | — | — | — | Balance |
|  | B1 | — | — | — | — | 3 |
|  | B2 | 3 | — | 0.7 | — | — |
|  | B3 | — | 3 | — | 0.7 | — |
|  | b4 | — | — | — | — | — |
|  | b5 | — | — | — | — | — |
|  | C1 | 0.9 | 0.9 | 0.3 | 0.3 | 0.9 |
|  | C2 | — | — | — | — | — |
|  | c3 | — | — | — | — | — |
| Test time | h | 48 | 48 | 48 | 48 | 48 |
| Impurities | mg/100 gOIL | 3.3 | 2.4 | 4.9 | 2.7 | 1.1 |
| Hue | ASTM D156 | L0.5 | L0.5 | L0.5 | L0.5 | L0.5 |

TABLE 3

|  |  | Comp. Example 1 | Comp. Example 2 | Comp. Example 3 | Comp. Example 4 | Comp. Example 5 | Comp. Example 6 | Comp. Example 7 |
|---|---|---|---|---|---|---|---|---|
| Composition (% by mass) | A1 | Balance | Balance | Balance | Balance | Balance | Balance | Balance |
|  | A2 | — | — | — | — | — | — | — |
|  | B1 | 0.5 | — | — | 0.5 | — | — | 3 |
|  | B2 | — | — | — | — | — | — | — |
|  | B3 | — | — | — | — | — | — | — |
|  | b4 | — | — | 0.5 | — | — | 3 | — |
|  | b5 | — | 0.5 | — | — | 3 | — | — |
|  | C1 | — | — | — | 0.3 | 0.9 | 0.9 | — |
|  | C2 | — | — | — | — | 0.9 | 0.9 | — |
|  | c3 | — | — | — | — | — | — | 0.9 |
| Test time | h | 48 | 48 | 48 | 96 | 168 | 168 | 48 |
| Impurities | mg/100 gOIL | 13.6 | 8.8 | 25.2 | 6.9 | 28.4 | 88.7 | 2.7 |
| Hue | ASTM D156 | D8.0 | L5.0 | L8.0 | L7.5 | L1.0 | D8.0 | L7.0 |

The invention claimed is:

1. A working fluid composition for a refrigerating machine comprising:
   a refrigerant consisting of
      difluoromethane (R32),
      pentafluoroethane (R125), and
      trifluoroiodomethane; and
   a refrigerating machine oil comprising:
      an ester-based base oil comprising a polyol ester of a polyhydric alcohol comprising pentaerythritol and a fatty acid having 4 to 9 carbon atoms,
      at least one epoxy compound selected from an alkyl glycidyl ether represented by the following formula (1) and an aryl glycidyl ether represented by the following formula (2):

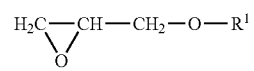

(1)

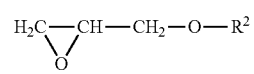

(2)

wherein
R$^1$ represents an alkyl group having 5 to 10 carbon atoms and
R$^2$ represents an aryl group having 6 to 12 carbon atoms; and a phenol-based antioxidant,
wherein a content of the ester-based base oil is 90% by mass or more, a content of the epoxy compound is 0.7% by mass or more and 5.0% by mass or less, and a content of the phenol-based antioxidant is 0.3% by mass or more and 3% by mass or less, based on a total amount of the refrigerating machine oil, and
wherein a ratio of (sum of content of R32 and content of trifluoroiodomethane)/(content of R125) is 50/50 to 95/5.

2. The working fluid composition for a refrigerating machine according to claim 1, wherein the epoxy compound comprises at least one selected from the group consisting of an alkyl glycidyl ether represented by the following formula (1) and an aryl glycidyl ether represented by the following formula (3):

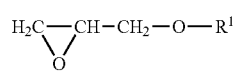 (1)

wherein $R^1$ represents a branched alkyl group,

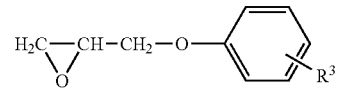 (3)

wherein $R^3$ represents an alkyl group.

3. The working fluid composition for a refrigerating machine according to claim 2, wherein the epoxy compound comprises the alkyl glycidyl ether represented by the formula (1).

4. The working fluid composition for a refrigerating machine according to claim 2, wherein the epoxy compound comprises the aryl glycidyl ether represented by the formula (3).

5. The working fluid composition for a refrigerating machine according to claim 1, wherein the ester-based base oil further comprises a complex ester.

* * * * *